(12) United States Patent
Smets et al.

(10) Patent No.: US 9,286,607 B2
(45) Date of Patent: Mar. 15, 2016

(54) METHOD AND APPARATUS FOR PAYMENT TRANSACTIONS

(71) Applicant: MasterCard International Incorporated, Purchase, NY (US)

(72) Inventors: Patrik Smets, Nijlen (BE); David Roberts, Warrington (GB)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 14/210,989

(22) Filed: Mar. 14, 2014

(65) Prior Publication Data
US 2014/0263625 A1    Sep. 18, 2014

(30) Foreign Application Priority Data

Mar. 15, 2013 (GB) .................................. 1304764.2

(51) Int. Cl.
*G06K 19/06* (2006.01)
*G06Q 20/34* (2012.01)
*G07F 7/08* (2006.01)

(52) U.S. Cl.
CPC ............ *G06Q 20/352* (2013.01); *G07F 7/0893* (2013.01)

(58) Field of Classification Search
CPC ...... G06Q 20/385; G06Q 20/40; G06Q 20/12; G06Q 20/20; G06Q 20/204; G06Q 20/24; G06Q 20/3255; G06Q 20/327; G06Q 20/352; G06Q 20/425
USPC .................................................. 235/380, 492
See application file for complete search history.

(56) References Cited

U.S. PATENT DOCUMENTS

| 6,044,349 | A  | * | 3/2000 | Tolopka et al. | ................ 705/1.1 |
| 8,032,424 | B1 | * | 10/2011 | Fastenau et al. | ........... 705/26.61 |
| 8,406,809 | B2 | * | 3/2013 | Florek | .................... G06Q 20/20 370/338 |
| 2007/0055630 | A1 | * | 3/2007 | Gauthier et al. | ................ 705/44 |
| 2010/0327054 | A1 | * | 12/2010 | Hammad | ...................... 235/375 |

* cited by examiner

*Primary Examiner* — Seung Lee
(74) *Attorney, Agent, or Firm* — Buchanan Ingersoll & Rooney PC

(57) ABSTRACT

A contactless card reader system comprises the a contactless card reader for short range wireless communication with a payment device using a contactless card protocol. The reader also comprises a terminal for exchanging data with the payment device and with a remote server to perform a contactless card transaction. The terminal is comprised in a personal computing device. The remote server may provide functionality to the terminal in performance of the transaction. A method of performing a transaction is also described.

12 Claims, 10 Drawing Sheets

METHOD AND APPARATUS FOR PAYMENT TRANSACTIONS

FIELD OF INVENTION

This invention relates to methods and apparatus for payment transactions, and in particular embodiments for the making of payments using short range communications technologies, in particular by contactless card protocols and in embodiments for personal use.

BACKGROUND TO INVENTION

Payment cards such as credit cards and debit cards are very widely used for all forms of financial transaction. The use of payment cards has evolved significantly with technological developments over recent years. Originally, transactions were on paper, using an imprint of a transaction card and confirmed by a signature. This approach was largely replaced by use of a magnetic stripe of a transaction card swiped through a magnetic stripe reader on a point of sale (POS) terminal to perform a transaction. Transaction cards developed to contain an integrated circuit ("chip cards" or "smart cards") communicate with a smart card reader in the POS terminal. Using this approach, a transaction is typically confirmed by a personal identification number (PIN) entered by the card user. Cards of this type typically operate under the EMV standard for inter-operation of chip cards and associated apparatus (such as POS terminals and ATMs). ISO/IEC 7816 provides a standard for operation of cards of this type.

Technology has further developed to provide payment cards which operate contactlessly—under EMV, these are covered under the ISO/IEC 14443 standard. Using such cards, the account number can be read automatically from the card by a POS terminal, generally using a short range wireless technology such as Radio Frequency Identification (RFID)—this approach is generally referred to as "contactless" or "proximity" payment. This is typically enabled by embedding of an RFID tag in a card body together with a suitable antenna to allow transmission and receipt of wireless signals—the transmissions may be powered by a radio frequency interrogation signal emitted by a proximity reader in the POS terminal. For an effective connection to be made, the payment card may need to be brought into very close proximity to the proximity reader—this has security benefits and prevents confusion if there are multiple enabled payment cards in the general vicinity of the proximity reader, as will typically be the case in a retail establishment for example. This may be achieved by tapping the antenna of the payment card against the proximity reader of the POS terminal.

The present applicants have developed a proprietary system, known as PayPass®, for performing contactless transactions. The present applicants have also appreciated that it would be possible to use a computing device such as a mobile telephone as a proxy for a payment card. They have also developed a mobile payment application, Mobile PayPass™, which can be downloaded to a mobile cellular telephone handset (hereafter "mobile phone") to act as a proxy for a payment card using Near Field Communication (NFC) technology standards, which are built in to the majority of current mobile phones. NFC is a development upon RFID, and NFC-enabled devices are able to operate in the same manner as RFID devices—though an NFC-device is active rather than passive, as it is powered by the mobile phone battery rather than relying on inductive pickup from a reader device. Using Mobile PayPass™, a user can conduct tapping based transactions with a proximity reader, as well as perform account management operations over an appropriate network interface (cellular, local wireless network) in an online banking interface with the user's account provider.

With the ever expanding capabilities of personal computers, laptops, tablets and other consumer devices to support more and more communications channels, products are now being developed with NFC and proximity communications channels as a standard feature. It would be desirable to use this new capability to improve the consumer experience when conducting payment or authentication related processes using personal computing devices.

SUMMARY OF INVENTION

In one aspect, the invention provides a contactless card reader system comprising a contactless card reader for short range wireless communication with a payment device using a contactless card protocol, and a terminal for exchanging data with the payment device and a remote server to perform a contactless card transaction, wherein the terminal is comprised in a personal computing device.

This contactless card reader system may be provided within a single device, such as a suitably equipped personal computer, or the contactless card reader and the terminal may be separate.

In another aspect, the invention provides a contactless transaction system, comprising: a contactless card reader for short range wireless communication with a payment device using a contactless card protocol; a terminal for exchanging data with the payment device and a remote server to perform a contactless card transaction, wherein the terminal is comprised in a personal computing device; and the remote server, which is adapted to provide at least a part of a transaction functionality to the terminal.

In a further aspect, the invention provides a method of performing a contactless transaction with a payment device, comprising contacting the payment device to a contactless card reader by short range wireless communication using a contactless card protocol, and the payment device exchanging data with a terminal and the terminal communicating with a remote server to perform a contactless card transaction, wherein the terminal is comprised in a personal computing device.

BRIEF DESCRIPTION OF FIGURES

Embodiments of the invention will now be described, by way of example, with reference to the accompanying figures, of which.

DESCRIPTION OF SPECIFIC EMBODIMENTS

Specific embodiments of the invention will be described below with reference to the Figures.

Figure 1:
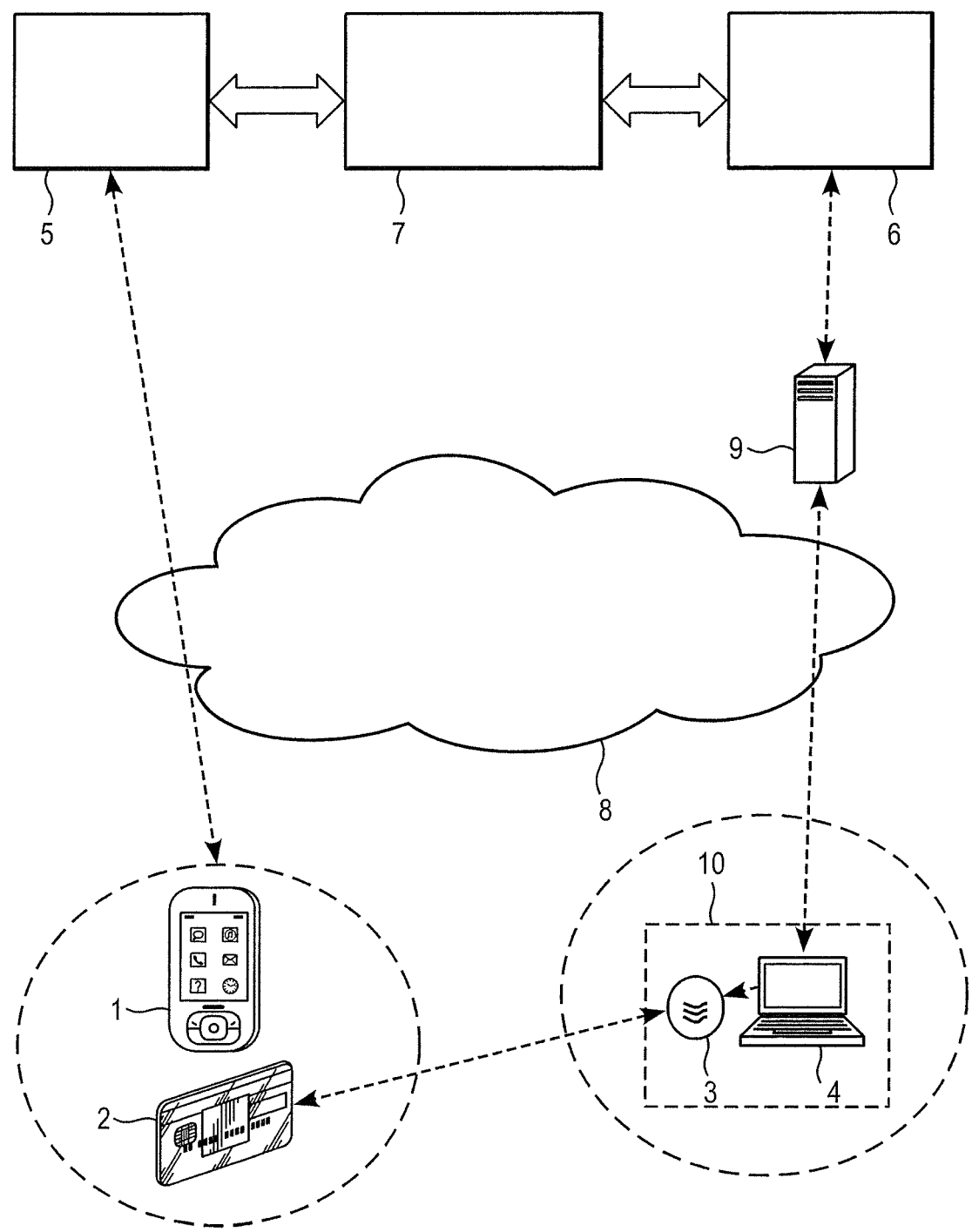
FIG. 1 shows a payment network architecture in which embodiments of the invention may be employed.

FIG. 1 shows schematically relevant parts of a representative transaction system suitable for implementing an embodiment of the invention. A user (not shown) is provided with a payment device—this may be for example a payment card 2, but in particular embodiments it may be a computing device used as a proxy for a payment card (such as a mobile phone 1). Mobile phone 1 is also shown as a mechanism for the user to interact with other elements of the system over a suitable network 8—network 8 here represents any appropriate communication network for the communication path indicated, and may be the public internet, a cellular communications network or a private network, depending on the parties involved in the communication and the need for the communication path to be secure.

The payment device is adapted to use a contactless protocol for communication with a personal point of interaction (POI) terminal 10 comprising a contactless reader 3 and computing apparatus such as a personal computer 4 (in embodiments, as discussed, below, the contactless reader 3 may be provided as a physically separate element to personal computer 4 or may be integrated within it). The payment card 2 must therefore include a chip and a wireless transmitter and receiver adapted for short range communication by protocols such as those defined under ISO/IEC 14443—if used as a payment device, the mobile phone 1 (which will typically be adapted to implement short range communication under the NFC standard) must have similar capability and an appropriate payment application installed. The operation of a prior art contactless POI terminal is described further below with reference to FIGS. 2A and 2B.

There may also be a mechanism to allow connection between the user computer devices and a card issuing bank 5 or system associated with the user. A banking infrastructure 7 will also connect the card issuing 5 and the merchant's transaction acquiring bank 6, allowing transactions to be carried out between them. This banking infrastructure will typically be provided by a transaction card provider who provides transaction card services to the card issuing bank 5. The banking infrastructure 7 provides authorization at the time of purchase, clearing of the transaction and reconciliation typically within the same working day, and settlement of payments shortly after that. The banking infrastructure 7 comprises a plurality of switches, servers and databases, and is not described further here as the details of the banking infrastructure used are not necessary for understanding how embodiments of the invention function and may be implemented.

Figure 2A:
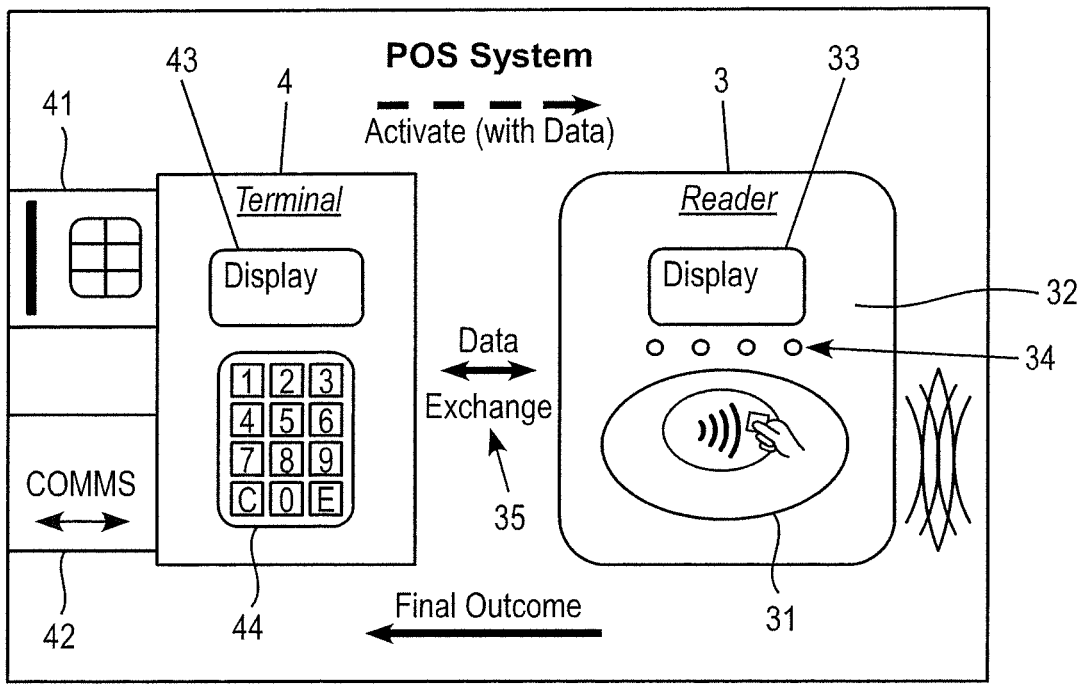
FIG. 2A shows a prior art reader and terminal architecture for contactless card transactions.

The elements of a contactless transaction will now be described with reference to FIGS. 2A and 2B, which illustrates the interaction between the reader 3 and the terminal 4 in a prior art contactless POI terminal—the payment device is not explicitly shown. The reader 3 comprises a wireless communication interface 31 for wireless communication with the payment device, and a cardholder side user interface 32 including here a reader display 33 and signal lights 34. The reader also has a data communication path 35 to the terminal 4—this may be a wired connection or a wireless communication over a suitable local communication network (preferably secured to prevent effective eavesdropping). The terminal 4 is shown here as a conventional POS terminal augmented by ability to communicate with the reader 3—it therefore comprises a reader interface 41 for interacting with other payment device types by contact (chip cards, magnetic stripes), a communication interface 42 for communicating directly or indirectly with a merchant's acquiring bank, and a user interface including a display 43 and a keypad 44 for use by merchant or customer as appropriate to the transaction.

Figure 2B:
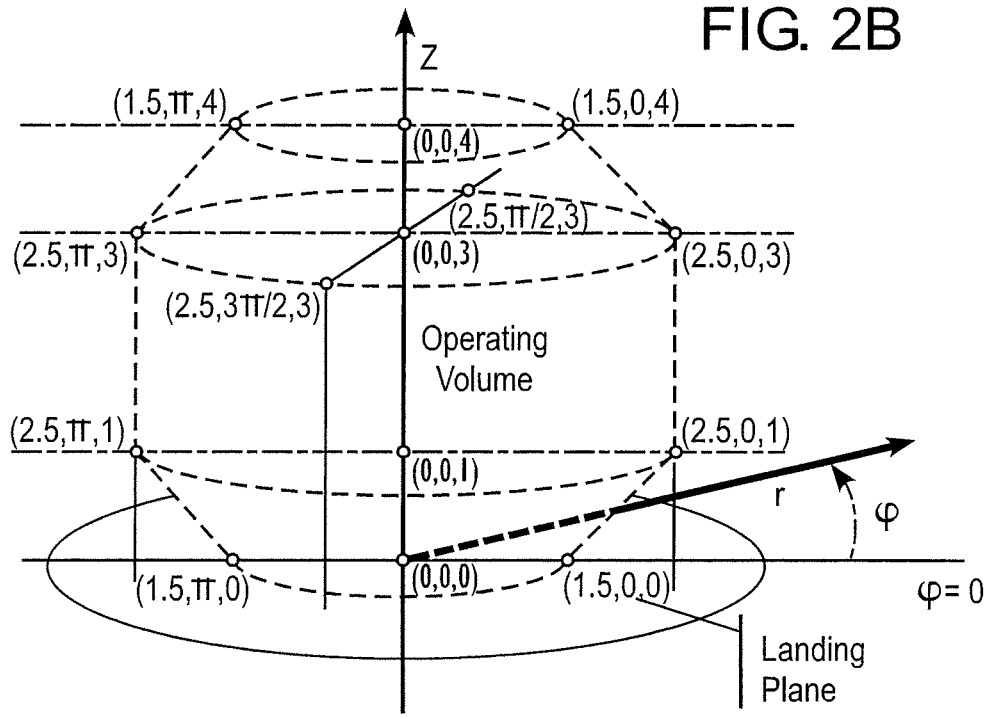
FIG. 2B shows an operating volume for a contactless card transaction.

A contactless transaction may be initiated by the merchant at the terminal 4 or by a payment device coming into range of the wireless communication interface 31 if a transaction is expected—this will involve a payment device entering within an operating volume of the wireless communication interface 31 and a landing plane that it defines on the reader 3, as is shown in FIG. 2B. The terminal 4 provides the reader 3 with sufficient details of the transaction and of the terminal to allow a transaction to take place between the two. The transaction follows protocols set out in the EMV Contactless Specifications for Payment Systems. The transaction amount is displayed to the customer on the reader display 33. The reader 3 provides sufficient information to the payment device to identify the transaction and the merchant and to provide confidence to the cardholder that the transaction is legitimate. The payment device provides sufficient information to identify the relevant cardholder account to the merchant, and to allow the merchant to authorise the transaction with the merchant's acquiring bank—authorisation may or may not be required during the transaction, depending on factors such as the size of the transaction. The reader 3 determines a final outcome for the transaction, which is then communicated to the terminal 4 and also to the payment device.

Figure 3:
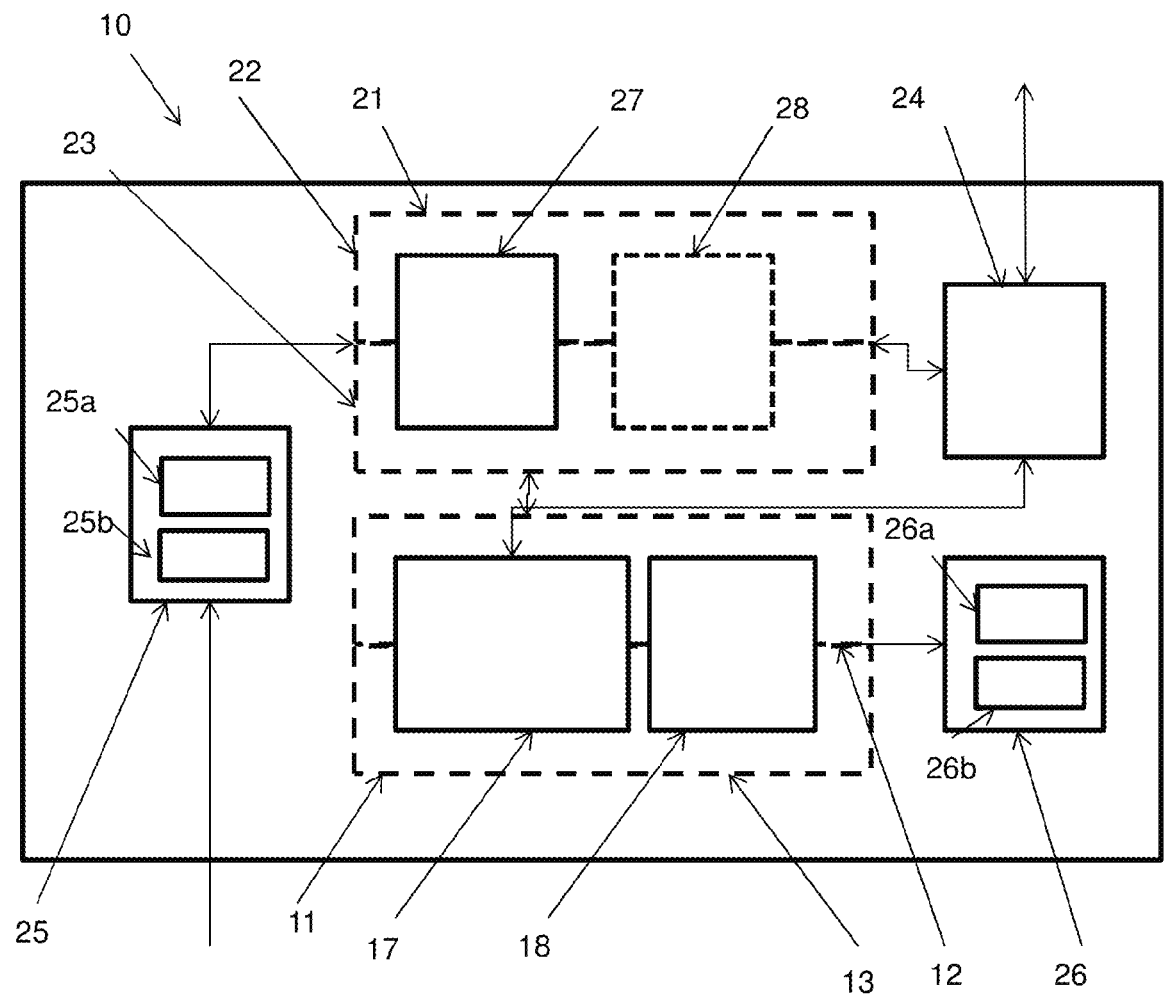
FIG. 3 shows a logical architecture for a reader and terminal combination according to embodiments of the invention.

FIG. 3 shows a logical architecture for a reader and terminal combination 10 according to embodiments of the invention. As is discussed further below with reference to FIGS. 4A and 4B, this logical architecture can be implemented in a single device (such as a personal computer) or in multiple devices (such as a personal computer attached to a reader dongle).

The reader and terminal combination 10 comprises a protected execution environment 21 comprising a protected environment processor 22 and a protected environment memory 23. In this protected environment a contactless protocol kernel 27 runs—a data exchange kernel 28 may also run in this environment, though as discussed below, in some embodiments the data exchange kernel may be implemented remotely. The protected execution environment 21 is in communication through networking interface 24 with a remote server 9, as shown in FIG. 1. The protected execution environment 21 can communicate with a payment device such as a payment card 2 through a contactless interface 25, comprising a wireless chipset 25a and an antenna 25b.

The reader and terminal combination also comprises a normal execution environment 11 including one or more processors 12 and memories 13—an operating system 17 and applications 18 run in this environment. The normal execution environment 11 communicates with a user interface 26 of the reader and terminal combination—this may comprise at least one display 26a and a keypad 26b—there may also be a direct, or an indirect but protected, communication path between the protected execution environment 21 and the user interface 26.

Figure 4A:
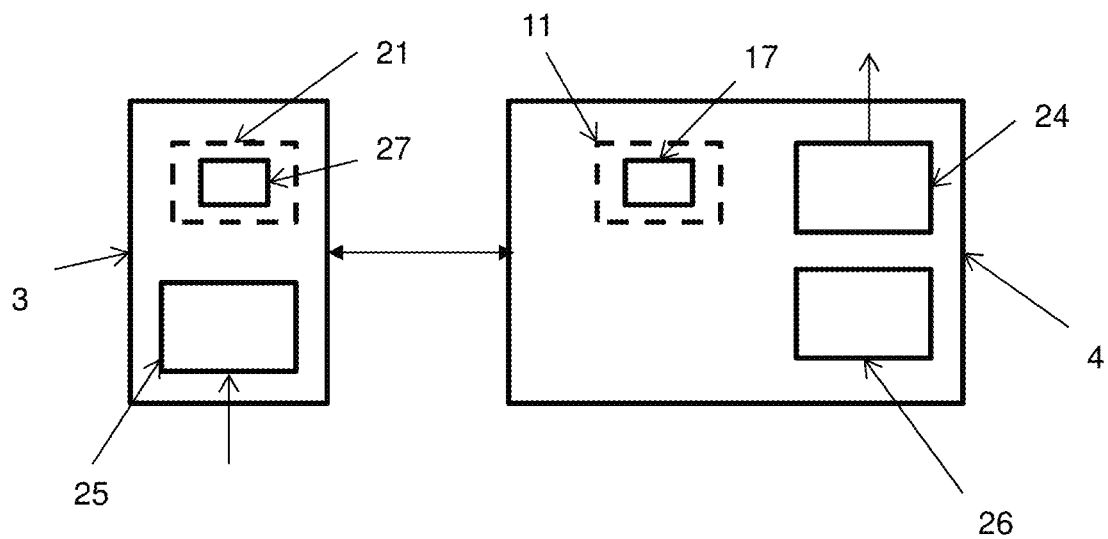
FIG. 4A and FIG. 4B show alternative embodiments of a personal contactless card reader and terminal according to embodiments of the invention.
Figure 4B:
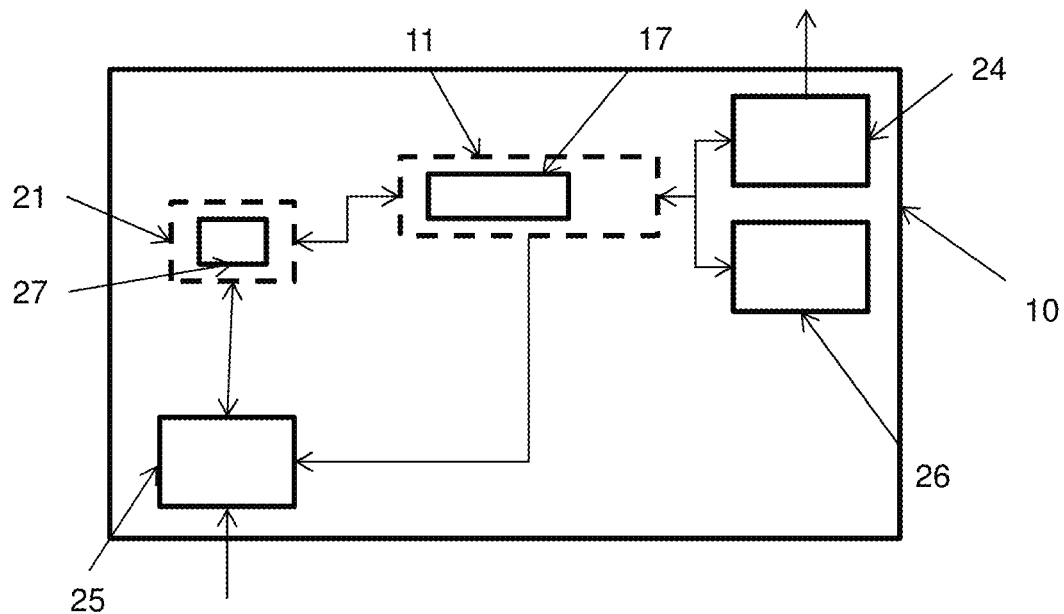

This contactless reader functionality may be included within, or added to, existing personal computer in a number of ways including smartphones, tablets and potentially other devices like TVs in addition to any consumer electronic devices that would have an internet connection. FIG. 4A and FIG. 4B show alternative embodiments of a personal contactless card reader and terminal according to embodiments of the invention.

FIG. 4A shows an arrangement in which the contactless card reader 3 is provided as a separate device to a personal computer acting as a terminal 4 (though as will be described below, much of the terminal functionality may in fact be performed by a server in communication with the terminal 4). The contactless card reader 3 may for example be provided as a dongle attached to the personal computer by a USB connection. The contactless card reader 3 comprises the protected execution environment 21 on which at least the contactless protocol kernel 27 runs, and also the contactless interface 25 including the functionality described above with a landing zone region, preferably indicated by a contactless symbol, on which a payment card or payment device should be tapped. The personal computer comprises the normal execution environment 11 and its operating system 17 and any applications. The personal computer also comprises the network connection 24 for communication with other devices, such as the server 9, and the user interface 26 including the display and keypad.

The Proximity Coupling Device (PCD) and PayPass application are embedded in a standalone (portable) device without internet connectivity. The internet connectivity is provided by plugging this device into another device with internet connectivity.

A PayPass example will now be described, for which the standalone device is encapsulated in a USB peripheral to be plugged into a PC. To control the commands that can be sent to a PayPass card, the USB device is hardcoded to only request Application Authentication Cryptograms (AAC) i.e. a type of cryptogram that cannot be used for (face-to-face) purchase transactions. For whatever technology is used i.e. WIFI, Bluetooth, Zigbee or other communication methods, the necessary drivers should be seamlessly provided so that the user need not be concerned with locating installing additional software. This functionality should be transparent to the user, in the same manner as an operating system update.

FIG. 4B shows an arrangement in which the contactless card reader and terminal are provided as an integrated device 10, which may be a practical solution when the hardware for short range networking capabilities exists in a personal computer so it is able to act as a contactless interface 25 when provided with suitable software. A Proximity Coupling Device (PCD) and PayPass application are fully embedded within the personal computing or consumer electronic devices with internet connectivity. For example: the personal reader may be integrated in the keypad of a PC and may be under control of a Trusted Execution Environment (TEE). The TEE then controls the commands that are sent to the PayPass card.

In terms of the architecture shown in FIG. 4B, the normal execution environment 11 is augmented with a protected execution environment 21 (this may be located in a secure element physically and logically protected from unauthorised subversion) and the remaining functionality provided within the personal computer as before.

The functionality of embodiments of the invention will now be described with reference to the aforementioned Figures. While methods and apparatus described here are described specifically in the context of PayPass, novel and inventive concepts are described below have more general application and are not limited in their application to existing or future PayPass technology. Any novel combination of technical features set out in this document provides differentiation over the prior art and may be considered an aspect of the present invention.

With the technology described here, consumers can tap their PayPass card or device on their personal PayPass-enabled reader a similar way as they do for face-to-face payment transactions. The discussion below describes integration of such PayPass functionality into personal computers or other computing devices. The detailed specification for all PayPass readers is described at the www.paypass.com web site, to which the person skilled in the art is directed. The "M/Chip Reader Card Application Interface Specification" is of particular relevance.

Due to the legacy of the plastic card industry and the fact that the first PayPass-compliant form factor was card based, the term "card" is used frequently throughout. However, the contactless nature of PayPass permits non-card form factors and mobile handsets. The former are referred to as PayPass devices, the later as PayPass handsets. The functionality of PayPass cards, devices and handsets is driven by the chip inside and is independent of the form factor in which the chip resides. In the majority of cases, the form factor makes no difference to the functionality of a PayPass-compliant reader, and therefore the default reference for the consumer token in this document is "PayPass card". Where there are specific requirements or considerations resulting from the form factor, mainly in the context of consumer-to-reader usability or cardholder verification, then this will be clear from the use of the reference "PayPass device" or "PayPass handset".

First of all, a user interface for the contactless card reader and terminal will be described.

As all contactless transactions will be conducted by the cardholder, the cardholder interface should provide a visual and audio interface along with optional vibration indication that the contactless portion of the transaction has completed successfully.

The combination of visual, audio and optional vibration indicators should ensure that a cardholder knows
 (1) When the personal reader is activated and a contactless card can be tapped against it
 (2) When a successful read has been completed and the contactless card, device or NFC phone could be removed away from the personal reader.

There are a variety of possibilities for how the personal reader on a personal computer is controlled and what kind of indication is given to the cardholder to show that the reader is active; the reader may be active at all times or may be switched on following processing decisions made by the controlling application or processing engine. Activation following a processing decision is preferred to reduce risks or malware attacks should a card be left in the operating volume of the reader. For the same reason operation well beyond the specified operating volume is not desirable.

Any display can be used to display appropriate cardholder or payment messages to indicate the progress of, and any required actions during the execution of, the contactless application process between the contactless cardholder device and the personal contactless reader. The display need not be incorporated into the personal reader itself. However, the card acceptance device should be designed such that the cardholder messaging display is clearly visible to the cardholder when they conduct a contactless transaction and are looking in the direction of the reader. This may be a particularly sensitive issue with NFC enabled smart phones, as these may contain much valuable cardholder information and would possibly need to respond to the reader's commands.

An audio indication is recommended to indicate a successful tap by a success tone. Volume for the audio indication might be controlled by the owner of the personal terminal and so might be have reduced volume, increased volume or volume turned-off by the user. A preferred success tone is a sound of approximately 1500 Hz sine wave or its equivalent for a period of 500 ms.

Software requirements arise in three categories:
(1) Interaction with the PayPass contactless card
(2) Interaction with the server
(3) Session management (1) For reading PayPass contactless cards, the following functionality is required:
- A Proximity Coupling Device (PCD) supporting a contactless protocol that is compatible with the contactless protocol (Level 1) as per EMV Book D: Contactless Communication Protocol. The latest version is available from www.emvco.com, and the EMV specification supersedes any requirements defined in any international standard. Contactless cards may be either Type A or Type B compliant as defined in the Contactless Communication Protocol. This functionality is provided by the contactless protocol kernel 27.
- A predefined subset of an application, also referred to as kernel, is used to exchange data (Level 2) with the PayPass contactless card. For the PayPass contactless card, there are two PayPass Application specifications: PayPass—Mag Stripe and PayPass—M/Chip. At least online authentication (with no CVM) should be implemented as the subset. Additional functionalities may be implemented at the discretion of the Personal Reader vendor. This is implemented by the data exchange kernel 28, which may be provided by or referenced by a payment or transaction application on the personal computer.

Interoperability is available, as the PayPass M/Chip specification includes support for PayPass Mag Stripe, so any PayPass M/Chip card will operate as PayPass Mag Stripe when presented to a personal PayPass Mag Stripe readers and all personal PayPass MChip readers initiate a PayPass Mag Stripe process when presented with a PayPass Mag Stripe card.

(2) Interaction with the Server

Transaction data (e.g. amount, currency) needs to be provided and the PayPass data needs to be sent to the issuer.

Figure 5:
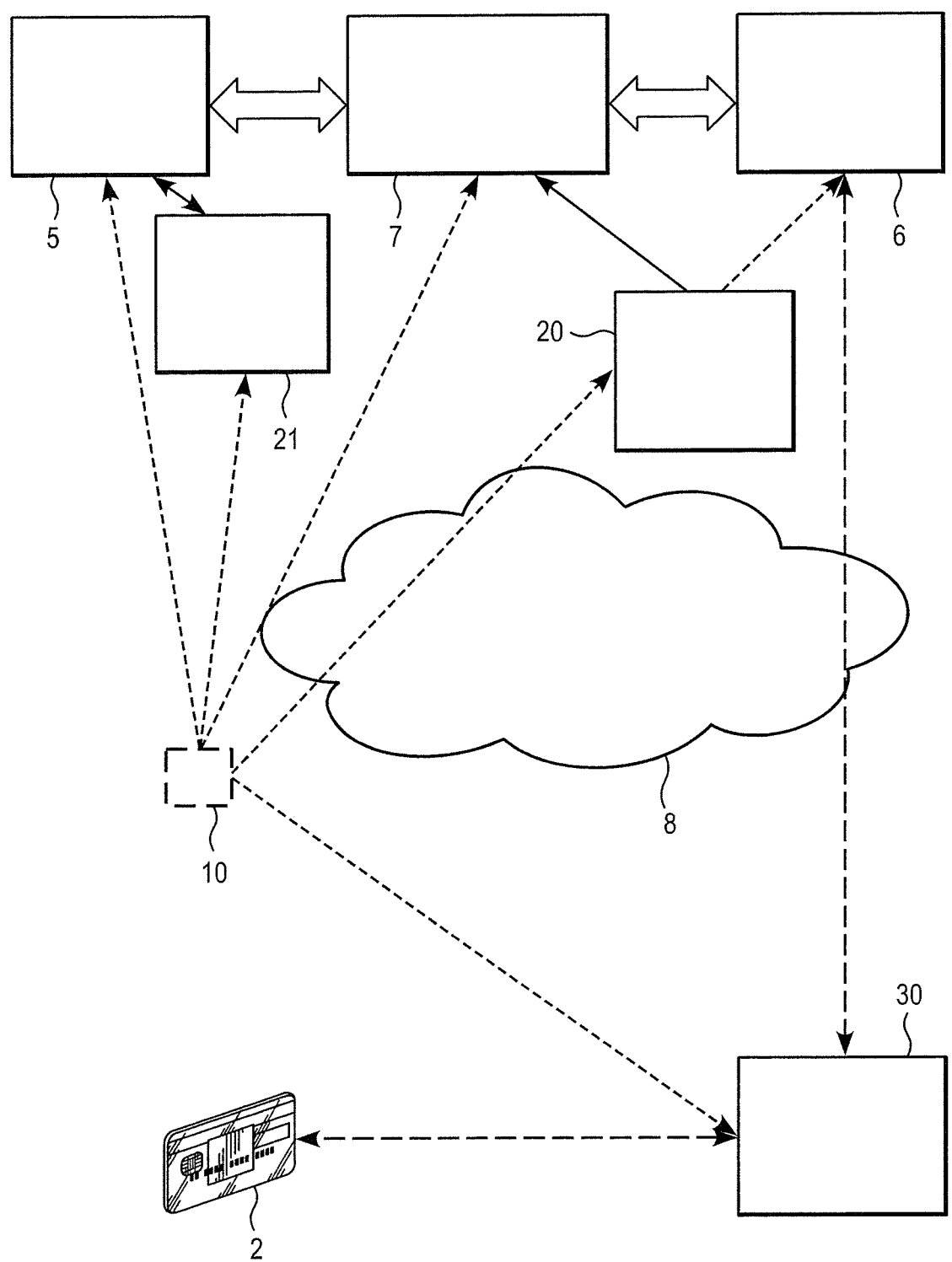
FIG. 5 shows alternative use models in a payment network for a reader and terminal combination according to embodiments of the invention.

The protocol to be used by the personal PayPass reader may vary with the service (payment or authentication) and with the server it is connected to. A shown in FIG. 5, a personal reader 10 may be connected to:
- a merchant/acquirer 6 and function as a distributed POS device for a payment transaction
- the card issuer 5 or an Access Control Server (ACS) 21 associated with the issuer 5, where it is used for authenticating the customer (e.g. for home banking or as part of a SecureCode transaction)
- the payment network 7, as a service provider to merchants/acquirers, to an issuer or to both
- the distributor/operator 20 of the personal reader, as a service provider to merchants/acquirers, the payment network, to an issuer or to all.

In all cases, the protocol used must ensure that the following conditions are met:
(a) Data cannot be read from the card without explicit cardholder consent and only for the purpose(s) the cardholder consented to.

As the application may be installed on a wide variety of platforms the possibility of rogue software that harvests card data must be considered. As a result, the commands that the reader can send to the card and the conditions under which it can send these commands have to be kept under tight control. It is difficult to tightly control the commands, given the various use cases for the personal reader. This then means that the security must come from the control and that the system must have some sort of a firewall (for example, the personal reader application must authenticate network servers that send instructions) to prevent non-authorized parties from sending instructions to the personal reader.

(b) The data exchanged between the personal reader and the card is protected and arrives unaltered while in transit to the issuer PayPass data received from the card is used by the card issuer or its delegate during any online processing to validate that the card is genuine; therefore, unless specified by the PayPass Mag Stripe or PayPass M/Chip specifications, all PayPass data retrieved from the PayPass cardholder device must be processed in accordance with the latest specifications before being presented to the issuer processing engine without modification. Unspecified modification of data may result in the transaction being declined during online processing.

(c) The source of the data is identified to the issuer as contactless.

PayPass data resembles data read from the physical magstripe (for PayPass-MagStripe) or data read from the contact chip (for PayPass-M/Chip) but with subtle differences, so if the issuer would validate PayPass data as if it were originating from magstripe or contact chip, the validation may fail. It is therefore important that the issuer knows the source of the data. The issuer may get the information on the origin of the data from various sources: either directly (authentication) or through the payment network (for payment). Personal reader vendors should provide functionality in the reader that identifies both the payment read process in this case contactless chip read and the personal reader's capabilities to have performed this read process. This information should be provided with each transaction, in a manner and format agreed upon with the entity the personal reader is connected to.

(3) Session Management

As indicated above, the personal PayPass reader can always be active. If so, it is possible that the consumer will tap their PayPass card or device on a reader at any stage in a transaction process, as the cardholder may tap at any time during the payment cycle. Such occurrences should be anticipated and have no adverse effect on the processing of the transaction. If required, the personal reader should allow for tapping at any time, however, the software (L2) must not buffer or store card details when a PayPass card is presented in advance of a new transaction starting. This is to ensure that details from a previous transaction are not mistakenly used. It should also be clear to the cardholder when a tap is required and for what purpose. If a tap is required as part of a sequence of cardholder interactions (for example entering some user ID then tapping to complete access) then it should be clear at the start of the sequence what the sequence expected will be.

To ensure an acceptable cardholder experience and prevent transaction tearing the interaction between the PayPass card and the personal reader must complete in as short a time as possible. Preferably the time required by the reader (i.e. excluding the time required by the card) for completing a PayPass Mag Stripe transaction is no greater than 200 milliseconds and for completing a PayPass-M/Chip transaction is no greater than 250 milliseconds.

These times are from the first wakeup message from the reader to the card that received a response from the card and which the reader received correctly until the indication to the cardholder that the card may be removed from the reader. A full description of the requirements may be found on www.paypass.com.

Preferably, any hardware and software elements or components used to create a personal PayPass-enabled reader will be individually identifiable to reduce the need to retest already approved product components. In addition, the application logic component should also maintain the version number of the relevant technical specification with which it is compliant. This data should be transmitted to the server or should be retrievable by the server.

Reader requirements for a payment transaction will now be described in more detail. These requirements must be fulfilled by the personal reader and, where appropriate, other components of the computing devices, when a payment transaction is initiated using PayPass technology.

Payment using a personal reader should be essentially the same as paying at the POS by tapping a PayPass card. However, the location of the functionality will be partitioned between local and remote components in order to satisfy the security concerns of the cardholder, merchant and bank and will differ depending on the design and configuration choices made. For all payments the underlying data, scheme and payment product rules should be the same. The normative requirements and low-level detail of implementing this functionality are detailed within the following:

Payment Scheme Rules.
Acquirer-specific host interface requirements.
PayPass Application Specifications.

For a cardholder, the high level steps of a PayPass payment transaction at a personal device will be:
 (1) Check the Brand—Check whether the PayPass brand is supported for this payment
 (2) Tap—Tap the PayPass card so that the reader can collect the card data; remove the card when the reader indicates that all data have been read
 (3) Verify User—If requested by the personal device, provide a means of cardholder verification that can be confirmed by the merchant, payment processor or issuing bank, for example by entering a security passcode.
 (4) Obtain Authorization—Wait for the authorization response (approval decline) from the issuing bank
 (5) Provide Proof of Purchase—receive confirmation of the outcome of the transaction that may be saved or printed).

Further details of these requirements are outlined below.

Check the Brand—The PayPass logo should be displayed prior to the initiation of a payment transaction conducted with a PayPass card. This brand display will normally be accomplished through the visual user interface of the device to which the personal reader is connected.

Tap—A common user interface should be used for guiding the customer through the transaction (authentication, payment or etc.) experience, when accepting PayPass transactions. This ensures that cardholders always know what to expect when using PayPass.

It is desirable to use the same indication as for face-to-face transaction at POS:
 A set of four clearly visual single color status indicators (for example green LEDs) on the actual personal reader; or
 A device/PC display that allows a graphical representation of the four indicators for example ")" that represents the status of the contactless payment transaction.

If LEDs or other indicators are to be used they should be equally spaced apart and shall be always visible to the cardholder while the PayPass card is being tapped. The cardholder interface will preferably contain both LEDs and a display but only one is required as a minimum. In the case where only a display is being used it should contain a minimum of three lines of characters to allow the display of the status indicators in the top line followed by two lines for cardholder messages.

The card acceptance device must be designed so that the status indicators (whether LEDs or on the display) are clearly visible to the cardholder when a card has been presented and a card read is in progress.

An audible indication (if not turned off) is preferably given when all the data are read and the card or device can be removed.

Verify User—While the specific configuration of a personal reader supporting PayPass is left open to accommodate differing requirements, it is important to ensure that the complete system facilitates a fast card/terminal interaction process. For example, it may be determined that when a PayPass card or device is used by a consumer to complete a payment transaction for a purchase at or below the equivalent of US $50, the payment application/reader may proceed and complete the transaction without any further cardholder interaction, including the entry of a PIN and no delivery of receipt by the reader itself.

Obtain Authorization—The outcome of the transaction (approve/decline) has to be communicated to the cardholder.

Provide Proof of Purchase—The system but not necessarily the reader itself should allow the cardholder to request a receipt. When a receipt is delivered, the input method used for the transaction will be identified. This will help both the cardholder and the merchant identify if it was a PayPass transaction, in the event of a refund.

The receipt should show the input method as "Contactless", "CONTACTLESS", "PayPass" or "RF" for PayPass transactions. As a security protection against potential identity theft the actual cardholder name should not be included in the card data obtained from a PayPass Card when read via the contactless interface. PayPass cards and devices are required to not include the actual cardholder name in Track 1 data read from the contactless chip or in tag 5F20. It is recommended to include the cardholder name as '/' in the track 1 data. Any payment systems that normally obtain and make use of the cardholder name from Track 1 data obtained from a magnetic stripe read must be able to accommodate this difference.

Payment processing requirements will now be described in more detail.

The acquirer of the transaction is required to provide the payment scheme provider and subsequently issuers of PayPass cards and devices with confirmation that:
 The payment was transacted using the PayPass interface.
 The reader was capable of conducting the transaction using the PayPass interface.

There should thus be functionality in the reader that identifies both the payment read process in this case contactless chip read and the personal reader's capabilities to have performed this read process. This information should be provided to the acquirer with each transaction, in a manner and format agreed upon with the acquirer.

The introduction of PayPass does not require any additional data validation to be performed unless specifically stated in the PayPass Application Specifications. Service code validation for the detection of Integrated circuit technology (2 or 6 in 1st digit) must not be performed on track 1 or track 2 data returned from a PayPass chip. This implies that reader payments processing engines must be aware of the source of the track data being either a magnetic stripe or a PayPass chip. A complete description of technical data validation requirements may be found in the PayPass—M/Chip Reader Card Application Interface Specification.

Where required by payment scheme rules, personal reader/ payment application should be capable of performing a refund using PayPass cards or devices.

Reader and server architectures will now be described with reference to FIGS. 6 to 10. Aspects of the architecture common to multiple embodiments will first be described.

There are two PayPass Application specifications, PayPass—Mag Stripe and PayPass—M/Chi, with a variation for mobile devices. The M/Chip specification is taken as the basis for the architectures below—the other specifications are derived from this. In this case, the functionality required is that of a combination of a PayPass Reader together with a terminal that manages its operation. The combination of the application and the protocol must ensure that:
  (1) data cannot be read from the card without explicit cardholder consent and only for the purpose(s) the cardholder consented to
  (2) the data exchanged between the personal reader and the card arrives unaltered at the issuer
  (3) the source of the data is identified to the issuer as contactless As discussed above, a personal reader may be used for different purposes. Common across the different uses are the following:
  Symmetric key cryptography is used between the card and the issuer to ensure the authenticity and the integrity of the transaction data.
  For Mag Stripe transactions CVC3 will be used as an identifier, as a contactless chip has been used. For EMV transactions an Application Cryptogram will be used.
  For a contactless EMV transaction, the reader can use public key cryptography (CDA) to authenticate the data from the card. The use of CDA is mandatory if the reader wants to make use of the on-device cardholder verification supported by Mobile M/Chip.
  The Cardholder Verification Method (CVM) to use is known by the customer or communicated to the customer by the issuer or the server.

The CVM list in PayPass cards—if there is one—does not apply for transactions on a personal reader. The entries in the CVM list of a PayPass card are signature, online PIN or both, in either order. Neither applies as the former assumes a merchant attended device while the latter assumes a merchant operated terminal. This means that if cardholder verification is provided, it will be provided through a different mechanism. Any of the following mechanisms may be used:
  1. a password or a passcode that is validated by a designated server. In this case, the password or passcode must be protected for confidentiality when sent to the designated server.
  2. a separate application that is managed locally by the personal reader. If CVM processing is done locally, the results should be provided in a form that maintains integrity as part of the transaction results sent to the server or condition the availability of the transaction results.
  3. on device cardholder verification, where the customer credentials entered on the cardholder device are validated by the cardholder device (e.g. when the cardholder device is a mobile phone or a display card with buttons).

Within this context, it is relevant to mention the Mobile M/Chip card application. In combination with a cardholder device supporting the Mobile M/Chip card application, the reader can reliably verify—based on CDA—that cardholder verification was completed successfully. This will require management of a second tap unless pre-entry of the PIN is used, which would simplify the design of a personal reader.

Preferred status indicators are as follows:

NOT WORKING Status
  Personal PayPass reader is either not powered on or if applicable, not communicating with any personal computing devices.
  No indicators or message displayed.

IDLE Status
  Personal PayPass reader is powered up and connected correctly, but not ready to read a contactless card or device. Further information, such as the transaction value, is required by the reader before a contactless read can commence.
  The first indicator shall 'blink on' for 200 ms every five seconds to indicate that the reader is powered on and communicating to any connected PC. If a PC display is used, indicate welcome.

READY TO INITIATE CONTACTLESS TRANSACTION Status
  Personal PayPass reader has all the required information to initiate a contactless payment transaction.
  One indicator displayed. Display shows transaction amount. If a PC display is used, show the transaction amount and present card.

Other statuses are not illustrated here like, Processing, Transaction Error, Contactless Error, Contactless Collision Detected, Card not removed from reader, Authorizing, Approved and Declined.

The remainder of this document focuses on the architecture in which the personal reader is connected to a server that is operated by the distributor of the personal reader and that has a level of control over the personal reader.

The distributor of the personal reader acts as a service provider to the merchant/acquirer (for payment) and the issuer (for authentication).

In general the following observations are made:
  A predefined subset of the contactless protocol (L1) should be implemented in the personal reader.
  The basic transaction flow of the kernel is best placed in the personal reader for performance purposes.
  If the personal reader is used for various applications, the firewall is preferably placed in the server. The server is then the gatekeeper and any instruction that is sent to the personal reader must go through the server. The server checks that the entity sending the instructions is authorized to do so.
  The server (and hence the merchant or accessed service) needs to be able to trust the reader's processing of the transaction. There are many techniques that can be used to build this trust including:
    Using CDA and checking the signature at the server. CDA demonstrates that the transaction details were authentically processed; online data authentication demonstrates that the card is current.

Using a cryptographic protocol between reader and server providing mutual authentication and data integrity The reader should be able to trust the authenticity of the server in making its request.

The personal reader should provide integrity in regard of transaction processing so that it functions reliably If the integrity of the payments systems keys can be assured, it is useful to have the reader perform Offline Data Authentication (ODA). If ODA is successful, the reader should still make available the data used in ODA so that it may be checked remotely in order for the merchant to be able to have confidence in data integrity.

The reader should be responsible for providing the display to the cardholder of the amount, transaction type and currency and for ensuring that the values used in the transaction match those shown to the cardholder The design of the reader should ensure that there cannot be an automatic continuation from display of amount to transaction completion without cardholder interaction, for example if the card were to be left in the field of the reader.

Five exemplary architectures will now be described. These provide different divisions of responsibility between the reader and the server.

Figure 6:
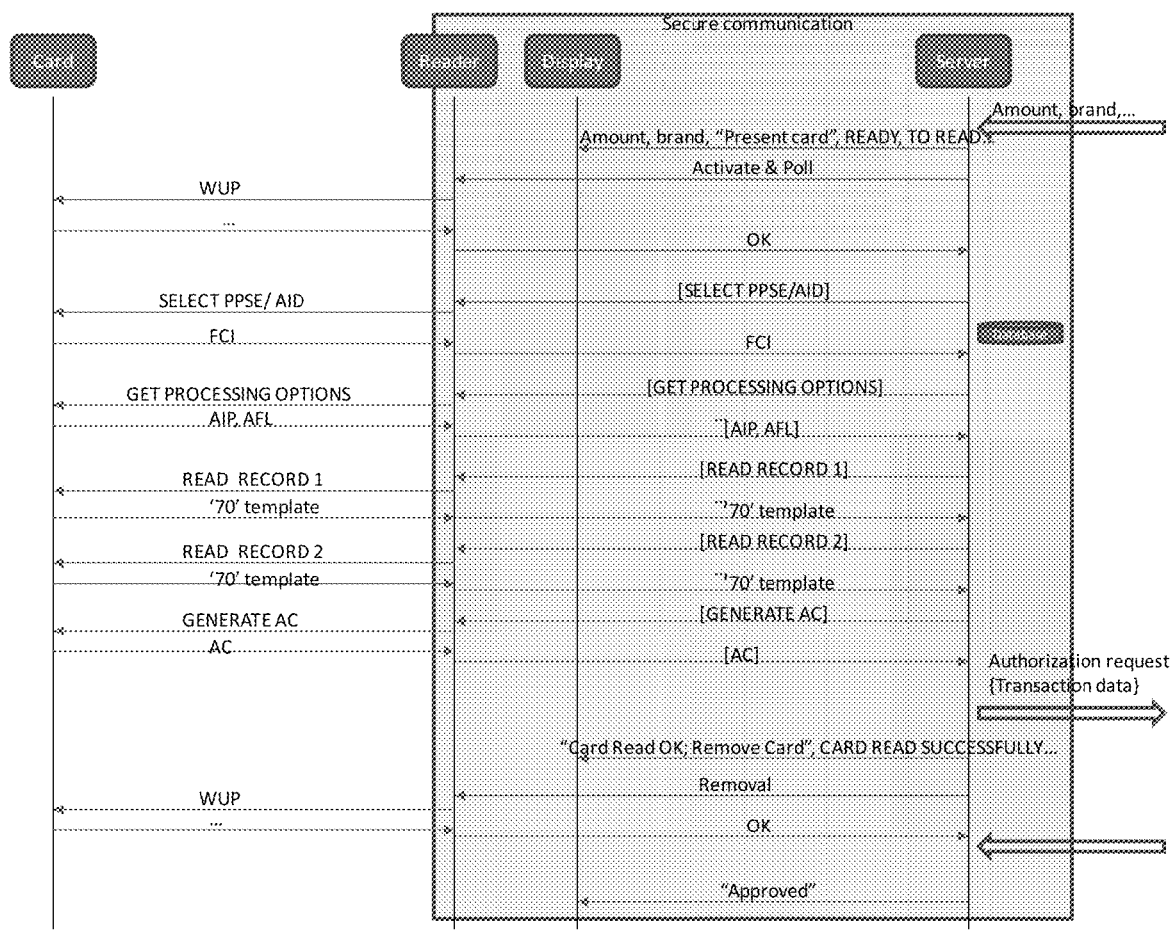
FIG. 6 shows a first exemplary architecture for division of roles between reader and server in embodiments of the invention.

FIG. 6 shows a first exemplary architecture for division of roles between reader and server in embodiments of the invention. In this arrangement, the personal reader is mainly a PCD (L1) and the kernel (L2), including its configuration database, is located in the server. The server acts as firewall and also drives the terminal functionality. This architecture is very similar to an EMV integrated POS device is referred to here as the "EMV architecture".

FIG. 6 illustrates the exchange between the different entities: card, reader, display and server. This shows the number of messages to be exchanged between the server and the reader. It includes:

The information to be put on display ("Please present your card", "Please remove your card", ... )

The instructions for the reader (Activate, start polling, start removal sequence, ... )

The APDUs exchanged between the reader and the card (SELECT PPSE, GET PROCESSING OPTIONS, ... )

This involves complexity (exception processing may be challenging) and latency. It is also hard for the reader to assist and enforce cardholder needs for authenticity of the transaction details as it must interpret a data exchange that it does not control.

Figure 7:
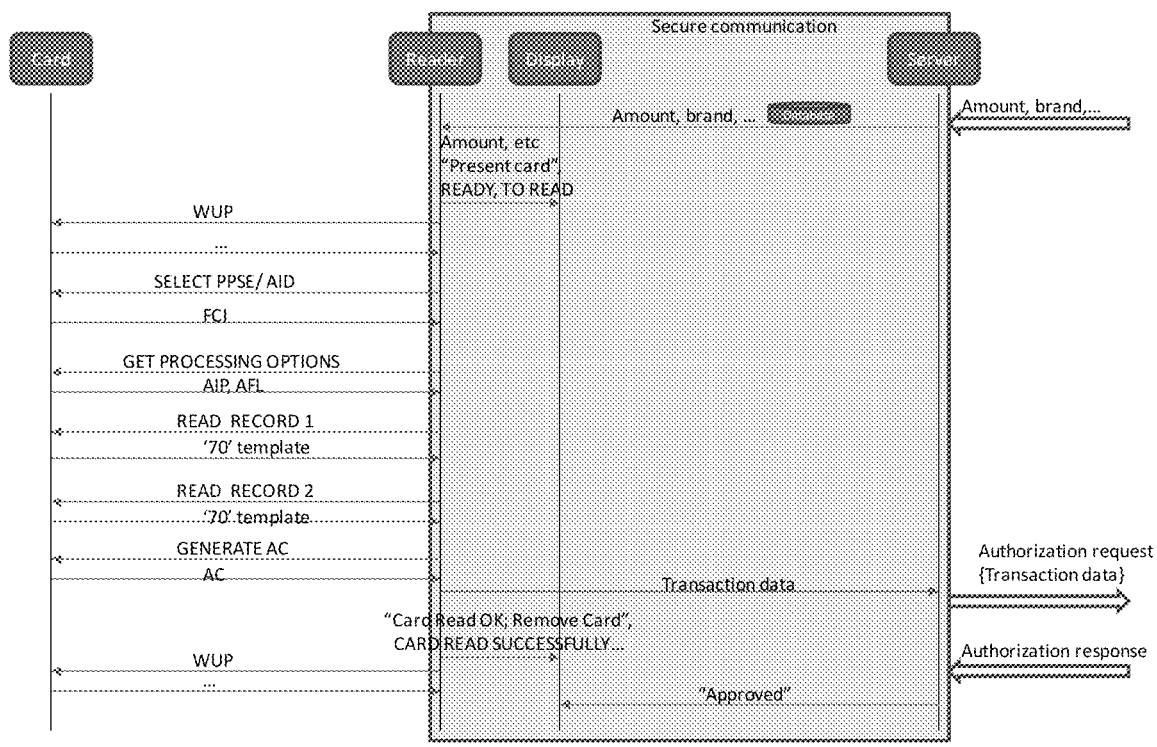
FIG. 7 shows a second exemplary architecture for division of roles between reader and server in embodiments of the invention.

FIG. 7 shows a second exemplary architecture for division of roles between reader and server in embodiments of the invention. In this approach, the personal reader implements the PCD and the kernel functionality, including its configuration database; the server drives (most) of the terminal functionality and ensures the firewall. This architecture is quite similar to architecture used for the v3.0 contactless reader and is further referred to as the "v3.0 architecture".

FIG. 7 illustrates the more limited data exchange between the server and the reader/display. The reader controls the full interaction with the card and drives the portion of the user interface that is linked to the card interaction ("Please present your card", "Please remove your card",). Once the card data have been retrieved, these are sent as a package (transaction data) to the server.

The v3.0 architecture that lies as the basis of the diagram below can usefully be extended for personal readers by:

the reader confirming directly the amount and transaction type to the display, the reader providing ODA related data such as CDA signatures, DOL and certificate data to the server so that it may verify the correctness of the reader processing The server indicates transaction type and any specific requirements to the reader at the start of processing. This is especially important if the reader may be used with multiple servers that may have differing requirements.

Figure 8:
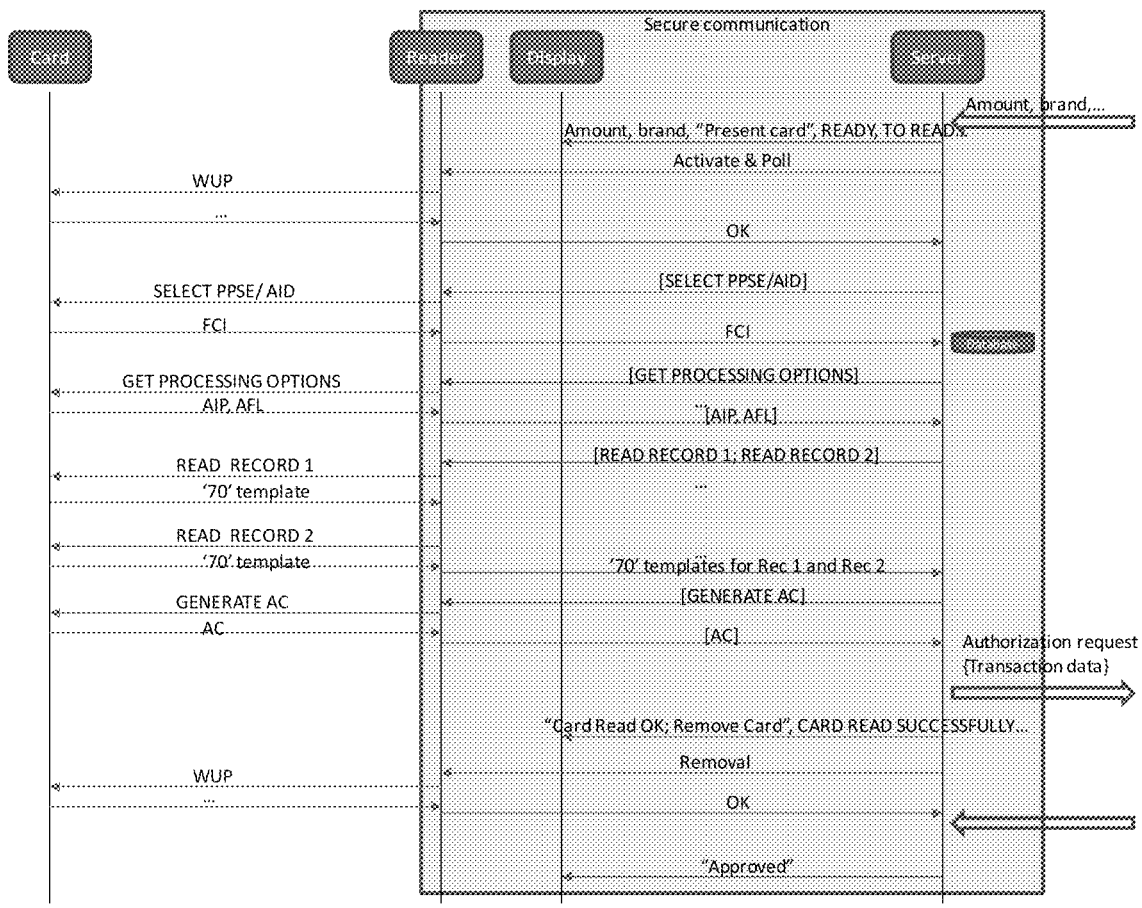
FIG. 8 shows a third exemplary architecture for division of roles between reader and server in embodiments of the invention.
Figure 9:
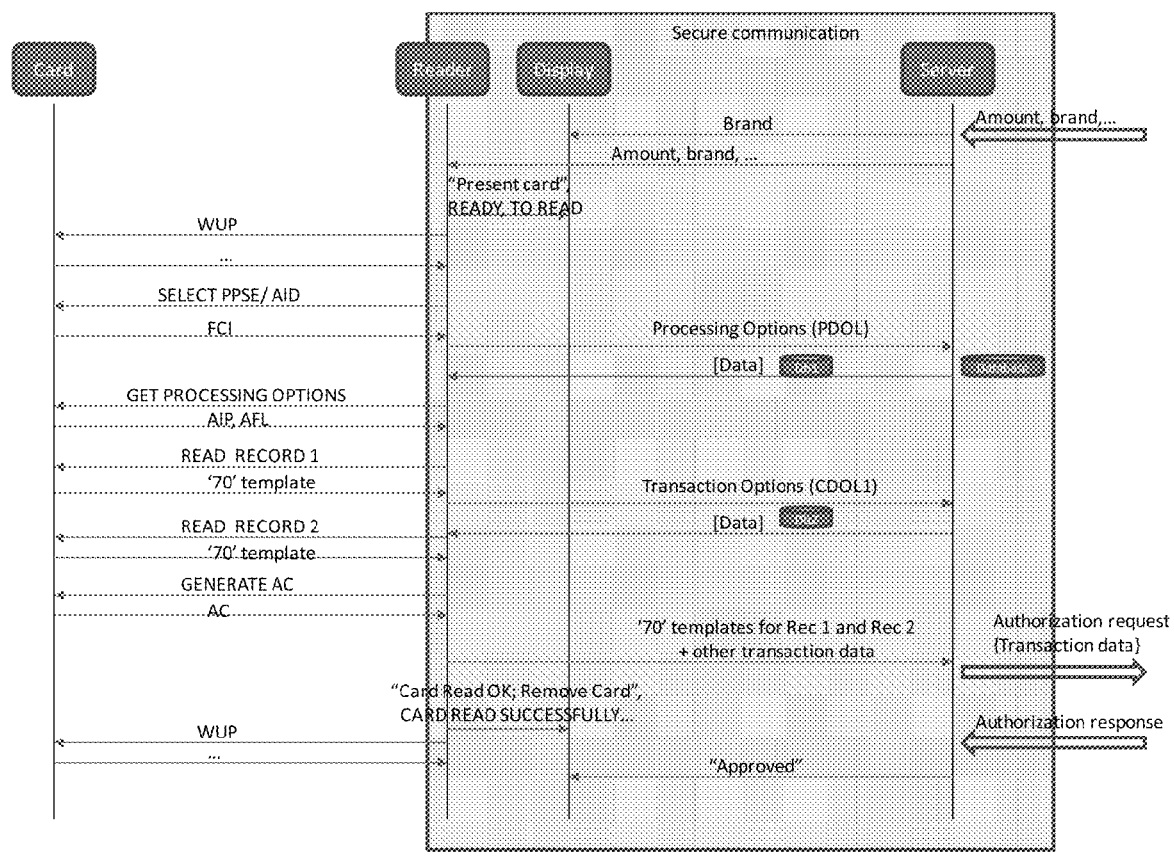
FIG. 9 shows a fourth exemplary architecture for division of roles between reader and server in embodiments of the invention.
Figure 10:
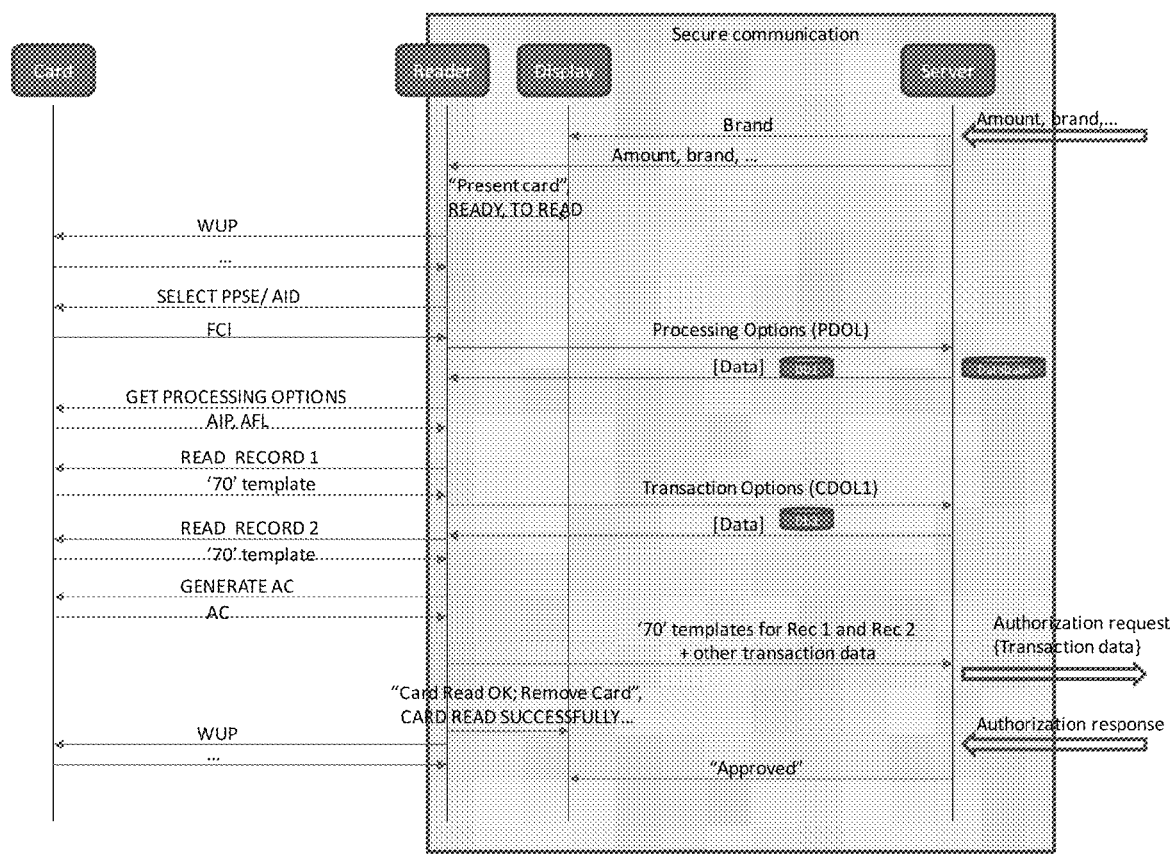
FIG. 10 shows a fifth exemplary architecture for division of roles between reader and server in embodiments of the invention.

FIGS. 8, 9 and 10 show three different architectures in which the personal reader implements the PCD and the part of the kernel functionality, while the server implements the other part of the kernel functionality and drives (most) of the terminal functionality. It also provides the firewall.

This type of architecture is typical for terminals deployed in multi-lane supermarkets, where the processing is distributed between the cardholder facing PED, the ECR and a central server. This architecture is further referred to as distributed architecture.

There are various options for splitting the functionality and the split can be done on software as well as the configuration data (the database). In some cases, this will result in some overlap of functionality between server and personal reader.

FIG. 8 shows a third exemplary architecture for division of roles between reader and server in embodiments of the invention. In this approach, the kernel software and database is implemented on the server, and the personal reader has some intelligence to stage the interaction and optimize the data exchange between personal reader and server. This is further referred to as "distributed architecture—server centric".

The server still drives the exchange; the main difference lies in the optimization of the communication (the number of messages between the server and the reader) at the cost of some intelligence in the reader. In particular, the number of messages linked to the READ RECORDs can be optimized. The Reader should help ensure the correct display or amount, currency and transaction type for the cardholder, ODA should be performed by the server etc. but due to the low level nature of the interface it may not be straightforward for the reader to police the transaction for the cardholder.

FIG. 9 shows a fourth exemplary architecture for division of roles between reader and server in embodiments of the invention. In this approach, the personal reader implements the kernel and the database and has the necessary intelligence to drive the transaction flow and stage the sending of the data to the server, and the server performs the validation of the data. This is further referred to as "distributed architecture—reader centric".

The reader drives the exchange but limits the data validation to a minimum i.e. just what is needed to push the transaction forward. The data retrieved by the reader is sent to the server that does the validation. The benefit from this architecture is that the server has the full view of the transaction and can forward this info to its customer e.g. a merchant/acquirer or an issuer. It is also relatively easy for the reader to assist in mediating the transaction flow.

FIG. 10 shows a fifth exemplary architecture for division of roles between reader and server in embodiments of the invention. The personal reader implements a part of the kernel software and its data base is populated at different stages by the server. So here there is a split in the kernel functionality as well as in the database. This is further referred to as "distributed architecture—balanced".

This variant leaves the reader in control of the transaction flow but confers to the server the ability to affect the transaction in two places. First, after the GPO command when the reader has decided how to process the transaction based on the card proffered, it may, if requested by the server, inform it of the way the transaction will be handled and offer it the opportunity to vary the outcome. Secondly, at Terminal Action Analysis, it may offer to the server the ability to alter (within limits) the results of TAA.

These options are summarised in Table 1 below:

TABLE 1

| FIG. | PCD (L1) | Kernel software(L2) | Kernel database | Firewall | Terminal | Comment |
|---|---|---|---|---|---|---|
| FIG. 6 | Personal reader | | | | Server | Less relevant for contactless as it suffers from performance issues. |
| FIG. 7 | | Personal reader | | | Server | Reader manages transaction flow details. No server interaction during flow |
| FIG. 8 | Personal reader | Personal reader & server | | Server | | Some optimization of the communication but still slower than other options. |
| FIG. 9 | Personal reader | Personal reader | Personal reader & server | | Server | Validation of the data is done by the server. Server needs to understand DOL handling |
| FIG. 10 5.6 | Personal reader | Personal reader & server | Personal reader & server | | Server | Reader manages transaction flow details and can affect transaction flow |

Another option, not illustrated, is for the personal reader to implement the kernel software, the data and the firewall. This may only be suited for single purpose readers.

As the skilled person will appreciate, modification may be made to the embodiments set out above without departing from the spirit and scope of the invention.

Some or all of the following acronyms are used in this document.

| | |
|---|---|
| AAC | Application Authentication Cryptogram |
| AC | Application Cryptogram |
| ACS | Access Control Server |
| AFL | Application File Locator |
| AIP | Application Interface Profile |
| APDU | Application Protocol Data Unit |
| CDA | Combined DDA/AC Generation |
| CDOL1 | Card Risk Management Data Object List 1 |
| CVC3 | Card Verification Code 3 |
| CVM | Cardholder Verification Method |
| DDA | Dynamic Data Authentication |
| DOL | Data Object List |
| ECR | Electronic Cash Register |
| EMV | Integrated Circuit Card Specifications for Payment Systems |
| EMVCo | The company that maintains the EMV specifications |
| FCI | File Control Information |
| GPO | Get Processing Options |
| M/Chip | MasterCard EMV Chip product family |
| NFC | Near Field Communications |
| ODA | Offline Data Authentication |
| PCD | Proximity Coupling Device |
| PDOL | Processing Data Object List |
| PED | PIN Entry Device |
| POS | Point of Sale |
| PPSE | Proximity Payment Systems Environment |
| TAA | Terminal Action Analysis |

-continued

| | |
|---|---|
| TEE | Trusted Execution Environment |
| TRM | Terminal Risk Management |
| USB | Universal Serial Bus |
| WUP | Wake-up |

The invention claimed is:

1. A contactless card reader system comprising:

a contactless card reader for short range wireless communication with a payment device using a contactless card protocol, wherein said contactless card reader includes therein a protected execution environment, which is a physically secured environment within the contactless card reader that is separate from other components within the contactless card reader, that (i) includes at least a protected environment processor and a protected environment memory and (ii) is configured to run a contactless protocol kernel that provides for contactless protocol compatibility; and a terminal for exchanging data with the payment device and with a remote server in order to perform a contactless card transaction, wherein the terminal is comprised in a personal computing device.

2. A contactless card reader system as claimed in claim 1, wherein the personal computing device is one of a personal computer, a tablet computer and a laptop computer.

3. A contactless card reader system as claimed in claim 1, wherein the contactless card reader is integrated with the terminal in a single device.

4. A contactless card reader system as claimed in claim 1, wherein the contactless card reader is provided as a separate device to the terminal.

5. A contactless card reader system as claimed in claim 4, wherein the contactless card reader is a dongle attached to the terminal.

6. A contactless card reader system as claimed in claim 1, wherein the contactless card reader comprises a wireless chipset and an antenna.

7. A contactless transaction system, comprising:
   a contactless card reader for short range wireless communication with a payment device using a contactless card protocol, wherein said contactless card reader includes therein a protected execution environment, which is a physically secured environment within the contactless card reader that is separate from other components within the contactless card reader, that (i) includes at least a protected environment processor and a protected environment memory and (ii) is configured to run a contactless protocol kernel that provides for contactless protocol compatibility;
   a terminal for exchanging data with the payment device and a remote server for performing a contactless card transaction,
   wherein the terminal is comprised in a personal computing device, and the remote server is configured to provide at least a part of a transaction functionality to the terminal.

8. A contactless transaction system as claimed in claim 7, wherein the server provides some or all of a transaction application used to exchange data with the payment device.

9. A contactless transaction system as claimed in claim 7, wherein the server provides a database for configuration data.

10. A contactless transaction system as claimed in 7, wherein the server provides a firewall to protect other systems.

11. A contactless transaction system as claimed in claim 7, wherein the contactless transaction system is adapted to perform in accordance with EMV protocols.

12. A method of performing a contactless transaction with a payment device, comprising:
   contacting the payment device to a contactless card reader by short range wireless communication using a contactless card protocol, wherein said contactless card reader includes therein a protected execution environment, which is a physically secured environment within the contactless card reader that is separate from other components within the contactless card reader, that (i) includes at least a protected environment processor and a protected environment memory and (ii) is configured to run a contactless protocol kernel that provides for contactless protocol compatibility;
   running, by said protected execution environment of said contactless card reader, a contactless protocol kernel; and
   exchanging data, by the payment device exchanging with a terminal and the terminal communicating with a remote server, to perform a contactless card transaction, wherein the terminal is comprised in a personal computing device.

* * * * *